May 18, 1954 W. H. BELLMER 2,678,779

TELEPHONE SET BASE WITH SELF-WINDING CORD REEL

Filed Oct. 9, 1952

INVENTOR.
WILLIAM H. BELLMER
BY J. Ledermann
ATTORNEY

Patented May 18, 1954 2,678,779

UNITED STATES PATENT OFFICE 2,678,779

TELEPHONE SET BASE WITH SELF-WINDING CORD REEL

William H. Bellmer, Jamaica, N. Y.

Application October 9, 1952, Serial No. 313,841

2 Claims. (Cl. 242—107)

This invention relates to a combination telephone set support and self-winding reel for the receiver cord.

It is an object of the present invention to provide a device which will serve as a supporting pedestal for the telephone set while at the same time functioning as a self-winding reel for the receiver cord.

It is another object of the present invention to provide a device of the above type which will automatically reel in the receiver cord when the telephone is not in use, thereby effectively preventing the receiver cord from becoming crinkled and coiled up in an objectionable manner.

It is still another object of the present invention to provide a device of the above type which includes novel means for clamping the receiver cord on the reel so as to prevent slippage during reeling and unreeling of the cord.

Other objects of the invention are to provide a combination telephone set support and self-winding reel for the receiver cord bearing the above objects in mind, which is of simple construction, inexpensive to manufacture, has a minimum number of parts, is easy to install and efficient in operation.

For other objects and for a better understanding of the invention, reference may be had to the following detailed description taken in connection with the accompanying drawing, in which.

Figures 1, 2, 3, 4:
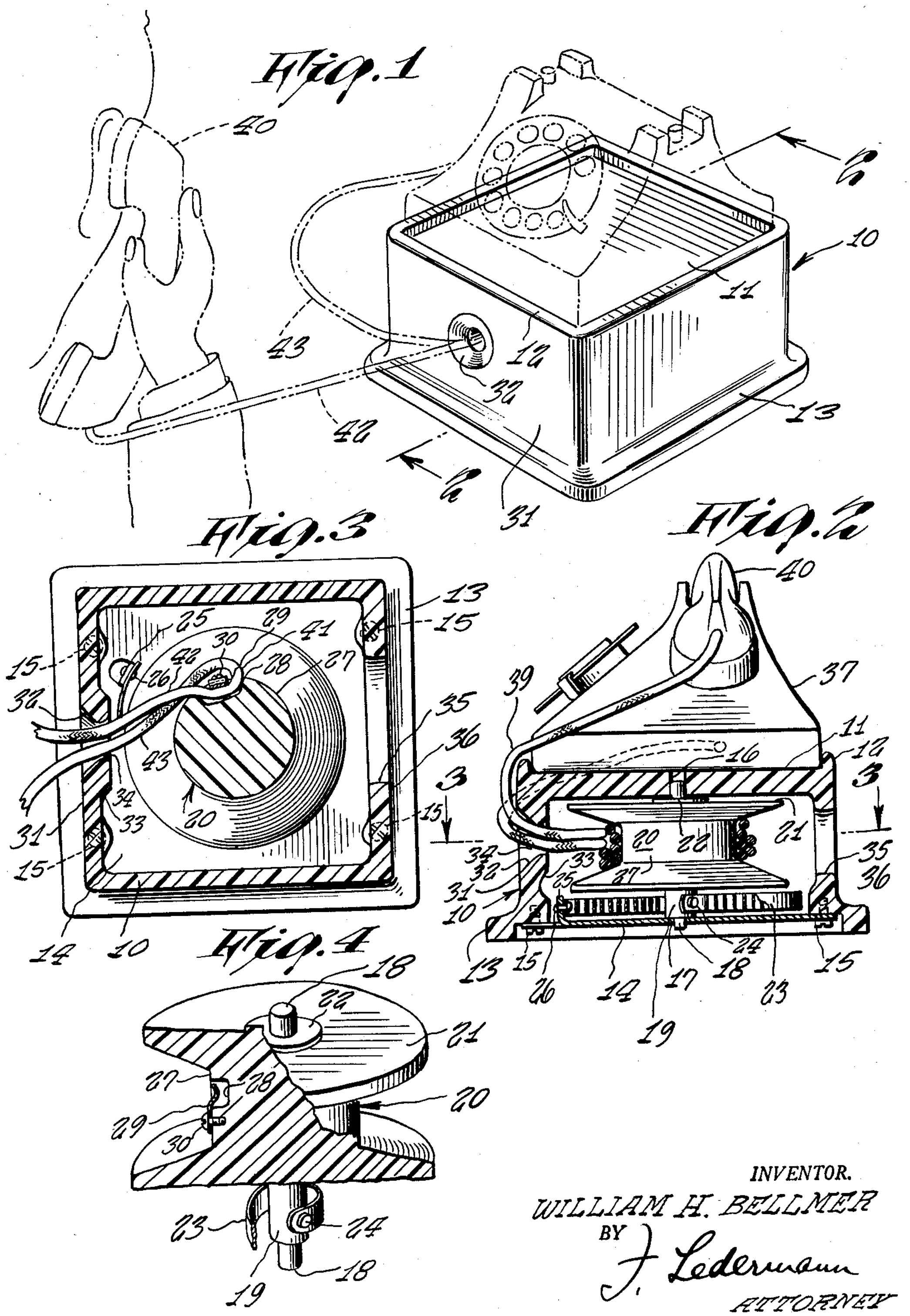
Fig. 1 is a perspective view of a combination telephone support and self-winding reel for the receiver cord embodying the features of the present invention and showing the same in operative use.
Fig. 2 is a vertical sectional view thereof taken along line 2—2 of Fig. 1.
Fig. 3 is a transverse sectional view thereof taken along line 3—3 of Fig. 2
Fig. 4 is a perspective view of the reel and its associated parts, shown partly in section.

Referring more in detail to the drawing in which similar reference characters designate corresponding parts throughout the several views, there is shown a hollow rectangular pedestal 10 of plastic or other suitable material, open at the bottom and having an integrally formed top wall 11. An upwardly extending peripheral flange 12 is integrally formed in the top wall 11 and is adapted to receive therewithin the base of the telephone when the latter rests on the top wall, substantially as illustrated in Figs. 1 and 2.

The side walls of the pedestal 10 are provided along their lower edges with an integrally formed, downwardly and outwardly extending flange 13, providing greater stability to the pedestal and freely spacing the lower edges of the side walls above the table, desk or other supporting surface for a purpose to be hereinafter referred to.

A removable bottom 14 is positioned below the bottom edges of the side walls and is secured in place by means of screws 15, as shown in Fig. 2.

The top wall 11 is provided with a central, circular opening 16 in vertical alignment with a corresponding opening 17 provided in the bottom 14, for a purpose to be referred to directly.

A vertically extending, cylindrical shaft 18 is rotatably mounted within the pedestal 10, the upper end of the shaft residing in the opening 16 while the lower end of the shaft passes through the opening 17. It will be noted that the upper end of the shaft does not extend to the top surface of wall 11 to avoid preventing the base of the telephone from lying flush with the wall 11. It will also be noted that the lower end of the shaft 18 does not contact the supporting surface on which the device rests due to the free spacing of the lower edges of the side walls thereabove previously referred to.

A sleeve 19 is rigidly secured to shaft 18 at its lower end above the removable bottom 14, thereby preventing downward displacement of the shaft through the bottom and its opening 17.

A spool 20 of plastic or other suitable material is rigidly mounted upon the shaft 18 directly above the sleeve 19, the spool extending upward to a point just below the inner surface of top wall 11, substantially as illustrated in Fig. 2. The top end 21 of the spool is provided around the central bore with an integrally formed washer member 22 which prevents friction-contact between the top wall 11 and the end 21 of the spool.

A concentric spring 23 surrounds the sleeve 19, being secured at its inner end to the sleeve 19 by means of a rivet 24 or other suitable fastening element, while its outer end is secured to an upstanding bracket 25 integrally formed in the inner face of bottom 14 by means of a rivet 26 or other suitable fastening element. It will be noted that when the spool is angularly displaced, the spring 23 will automatically return it to its original position.

The spool 20 at the outer surface of its central cylindrical portion 27 is provided with an opening 28, the central portion 27 curving outwardly at each end of the opening 28, as shown in Fig. 3, whereby the outer portion of the opening 28 is substantially larger than the inner portion. A spring clamp 29 is secured to the central portion 27 directly below the opening 28 by means of a screw 30, the upper end of the clamp extending across the opening 28 to terminate short of the top edge of the opening, substantially as illustrated in Fig. 4, the clamp curving concavely inwardly into the opening at this upper portion.

The front wall 31 of the pedestal 10 is provided with a central opening 32, flared inwardly so as to be substantially frusto-conical in shape, as shown in Figs. 2 and 3, the inner face of the wall 31 surrounding the opening 32 having an inwardly extending, integrally formed flange 33. The flange 33 is bevelled around its inner periphery as at 34 for a purpose to be hereinafter referred to.

An opening 35 in the rear wall 36 of the pedestal 10 permits access to the spool 20 and clamp 29 without the necessity of removing the bottom 14.

To install my device, the pedestal 10 with its internal parts properly assembled therewithin is placed below the base 37 of the telephone set whereby to support the same, the flange 12 surrounding the base 37 and preventing lateral displacement of the latter upon the pedestal. The base 37 is placed upon the pedestal 10 so that the dial 38 overlies the opening, as shown in Fig. 1.

The receiver cord 39, connecting the receiver 40 to the base 37, is looped at its midpoint 41 and inserted into the opening 32 and pushed around the spool 20 by means of the curved inner portion 34 of flange 33 until the loop 41 reaches the rear opening 35, where it is temporarily retained outside of the pedestal 10. The spool 20 is then rotated by insertion of a finger into the opening 35, against the action of the spring 23 three or four times around, bringing the clamp 29 adjacent the opening 35. At this point, the loop 41 is inserted behind the spring clamp 29, with the half 42 of the cord 39 which leads to the receiver 40 directly under the clamp, as shown in Fig. 3. The spring clamp 29 firmly secures the wire or cord 42 within the opening 28 and effectively prevents slippage on the spool when the receiver is removed from the base 37. The spool 20 is then released and permitted to return to its original position under the action of the spring 23, reeling the cord 39 onto the spool as shown in Fig. 2. The device is now ready for use.

When the receiver 40 is removed from the base 37, as shown in Fig. 1, this motion pulls the half 42 of cord 39, thus unreeling the cord on the spool the desired amount, the other half 43 of the cord following the half 42 through the bevelled opening 32 due to friction between the halves. When the call is completed, the receiver 40 is replaced on the base 37, with the spring 23 automatically reeling in the cord 39.

It should now be apparent that there has been provided a combination telephone set support and self-winding reel for the receiver cord which will automatically reel in the receiver cord when the telephone is not in use, thereby effectively preventing the receiver cord from becoming crinkled and coiled up and which includes novel means for clamping the receiver cord on the reel so as to prevent slippage during reeling and unreeling of the cord.

While various changes may be made in the detailed construction, it shall be understood that such changes shall be within the spirit and scope of the present invention as defined by the appended claims:

1. A combination telephone handset support and self-winding reel for the telephone receiver cord comprising a hollow pedestal open at the bottom and having a horizontal top wall adapted to support the telephone handset, an upwardly extending flange secured to the periphery of said top wall and adapted to receive the handset therewithin, a removable bottom secured to said pedestal, a downwardly extending flange secured to the bottom periphery of said pedestal whereby to freely space said bottom above the supporting surface, aligned bearings in said top wall and bottom, a rotatable shaft located within said bearings, an enlarged sleeve secured to said shaft above said bottom whereby to prevent vertical displacement of said shaft through the bearing in said bottom, a spool rigidly mounted upon said shaft above said sleeve, a concentric spring surrounding said sleeve, one end of said spring being secured to said sleeve, the outer end of said spring being secured to said removable bottom, said pedestal having an opening therethrough, said spool at its outer surface having an opening, a spring clamp secured at one end to said spool adjacent said spool opening and having the other end thereof extending partially across said opening, said opening in said spool and said clamp cooperatingly securing the middle portion of the receiver cord therewithin whereby to wind said cord upon said spool in a doubled-up manner, said cord passing through said opening, said pedestal surrounding said opening being beveled inwardly and outwardly to facilitate entry of the cord.

2. The combination set forth in claim 1, the other end of said spring clamp being curved concavely inwardly into said spool opening.

References Cited in the file of this patent

UNITED STATES PATENTS

| Number | Name | Date |
|---|---|---|
| 492,808 | Jenkins | Mar. 7, 1893 |
| 832,366 | Davis | Oct. 2, 1906 |
| 1,946,778 | Cline | Feb. 13, 1934 |

References Cited in the file of this patent

FOREIGN PATENTS

| Number | Country | Date |
|---|---|---|
| 375,146 | Great Britain | June 23, 1932 |
| 190,852 | Switzerland | Mar. 15, 1937 |